United States Patent

Hara et al.

[11] Patent Number: 5,963,243
[45] Date of Patent: Oct. 5, 1999

[54] EXPOSING DEVICE FOR CORRECTING AN Fθ ERROR OF A ROTATABLE POLYGON MIRROR WITHOUT USING AN Fθ LENS

[75] Inventors: Kei Hara, Shizuoka-ken; Yoriyuki Sunaga, Numazu, both of Japan

[73] Assignee: Kabushiki Kaisha TEC, Shizuoka, Japan

[21] Appl. No.: 08/335,997

[22] Filed: Nov. 8, 1994

[30] Foreign Application Priority Data

Nov. 10, 1993 [JP] Japan ................................. 5-281373
Jan. 7, 1994 [JP] Japan ................................. 6-000522

[51] Int. Cl.[6] .......................... B41J 2/47; B41J 15/34; G01D 15/14; G02B 26/00
[52] U.S. Cl. ........................... 347/251; 347/261
[58] Field of Search ................. 347/131, 256, 347/258, 261, 244, 251; 395/159, 132; 359/205, 206; 372/38, 24, 33

[56] References Cited

U.S. PATENT DOCUMENTS

| 4,847,641 | 7/1989 | Tung ........................ 347/131 |
| 4,853,710 | 8/1989 | Shimada et al. ............. 347/261 |
| 5,029,108 | 7/1991 | Lung ........................ 395/132 |
| 5,309,177 | 5/1994 | Shoji et al. ................ 347/131 |

FOREIGN PATENT DOCUMENTS

5-11460  2/1993  Japan .

*Primary Examiner*—Benjamin R. Fuller
*Assistant Examiner*—Raquel Yvette Gordon
*Attorney, Agent, or Firm*—Frishauf, Holtz, Goodman, Langer & Chick

[57] ABSTRACT

An exposing device is composed of a photosensitive drum having a surface partitioned into a plurality of exposure areas in a main scanning direction, for carrying an image formed by exposing the surface, a laser light source for emitting a laser beam, a polygon mirror for rotating at a constant speed to scan the surface of the photosensitive drum in the main scanning direction with the laser beam from the laser light source, and an exposure control circuit for producing items of emission data for one line while the number of emission data items for one dot is varied for each exposure area, and for supplying the emission data items for one line to the laser light source in response to a print clock pulse. Particularly, the exposure control circuit includes a CPU for multiplying a reference value for the number of data items which should be selected from emission data items for a dot and changed in value to obtain a predetermined function, by a coefficient for an exposure area to which the emission data items for the dot are assigned, and for changing the value of each data item selected from the emission data items for the dot in number corresponding to a result of multiplication.

3 Claims, 11 Drawing Sheets

EXPOSING DEVICE FOR CORRECTING AN Fθ ERROR OF A ROTATABLE POLYGON MIRROR WITHOUT USING AN Fθ LENS

BACKGROUND OF THE INVENTION

1. Field of the Invention

This invention is related to laser printers having a function of correcting an fθ error, and particularly, to an exposing device for the laser printer in which the fθ error is corrected without using an fθ lens.

2. Description of the Related Art

Figure 1:
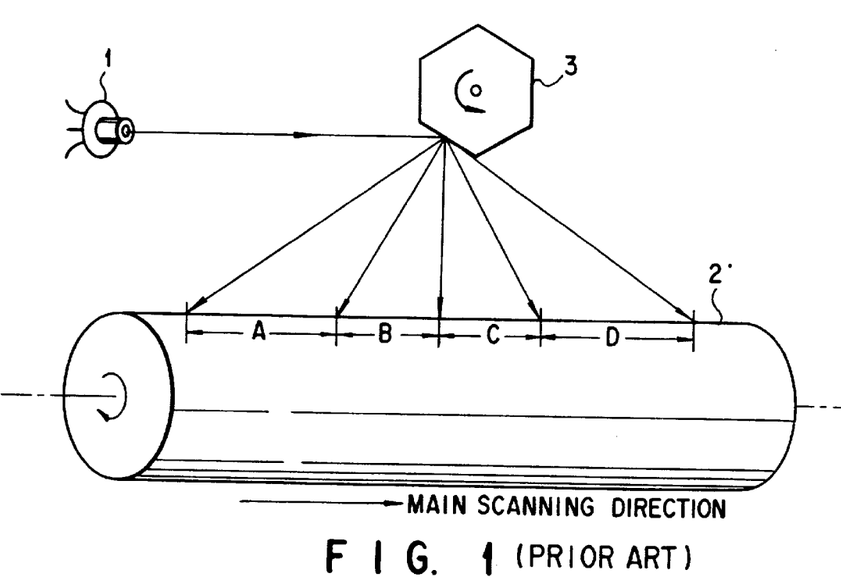
FIG. 1 is a view showing an exposure section of a conventional laser printer.

FIG. 1 shows an exposing section of conventional laser printers. In the laser printer, a laser diode 1 is driven on the basis of image information to emit a laser beam toward a polygon mirror 3 rotating at a constant speed. The polygon mirror 3 reflects the laser beam according to its mirror angle fθ so as to scan and selectively expose the surface of a photosensitive drum 2 in a direction shown in FIG. 1. In this exposing operation, an image for one line is formed on the surface of the photosensitive drum 2 as an electrostatic latent image. A dot is formed by driving the laser diode 1 continuously for a period of the dot exposing cycle. A space is formed by inhibiting the driving of the laser diode 1 continuously for a period of the dot exposing cycle. The photosensitive drum 2 is rotated by a preset amount each time the scanning is effected for one line. An image for lines thus obtained is developed as a toner image in which toner is adhered to dot portions, and transferred onto a sheet of paper.

The scanning speed in the main scanning direction varies with the mirror angle fθ of the polygon mirror 3. This is a factor which makes the sizes of dots forming an image on the surface of the photosensitive drum 2 to be non-uniform. For example, when the surface of the photosensitive drum 2 is partitioned into four exposure areas A, B, C and D is sequentially scanned for ¼ scanning periods, the width of each dot is relatively large in the exposure areas A and D positioning at end portions of the photosensitive drum 2 and is relatively small in the exposure areas B and C positioning at center portions thereof.

Conventionally, an fθ error which thus occurs depending on a mirror angle fθ is corrected by means of an fθ lens (not shown) which is arranged between the polygon mirror 3 and the photosensitive drum 2 and refracts the laser beam from the polygon mirror 3 according to the mirror angle fθ such that the scanning speed is adjusted to be constant. In this correction technique, however, the total number of components is increased and a space for mounting the fθ lens is required. Therefore, there is a problem that it is difficult to attain a laser printer of a small size and a low cost.

Figure 2:
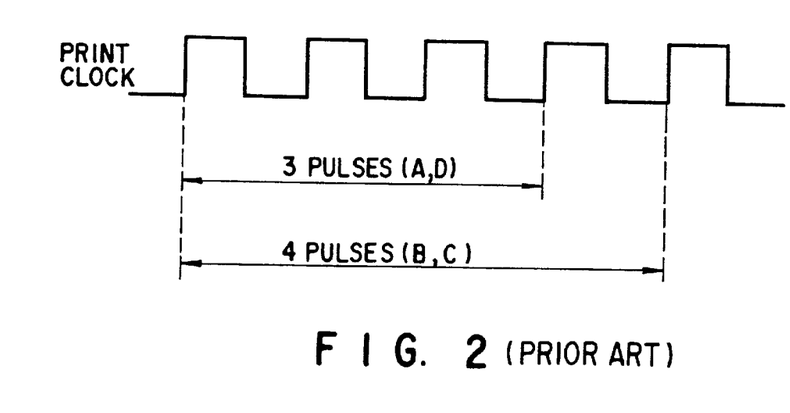
FIG. 2 is a time chart for explaining a technique of correcting an fθ error which depends on a mirror angle of a polygon mirror shown in FIG. 1.

As another correction technique, a technique which does not use an fθ lens as stated above and controls the dot exposing cycle during the scanning of exposure areas such as the areas A, B, C, and D in the main scanning direction is known. In this technique, the dot exposing cycle for each dot is set to be shorter in the scanning of the exposure areas A and D than in the scanning of the exposure areas B and C. As shown in FIG. 2, the period of the dot exposing cycle is set equal to a period corresponding to three print clock pulses in the scanning of the exposure areas A and D, and to a period corresponding to four print clock pulses in the scanning of exposure areas B and C, for example. Accordingly, the width of each dot can be uniform among the exposure areas A, B, C, and D. Further, an fθ error can be more accurately corrected if the surface of the photosensitive drum 2 is partitioned into more exposure areas than four and the dot exposing cycle is variably set according to each of the exposure area.

Figure 3A:
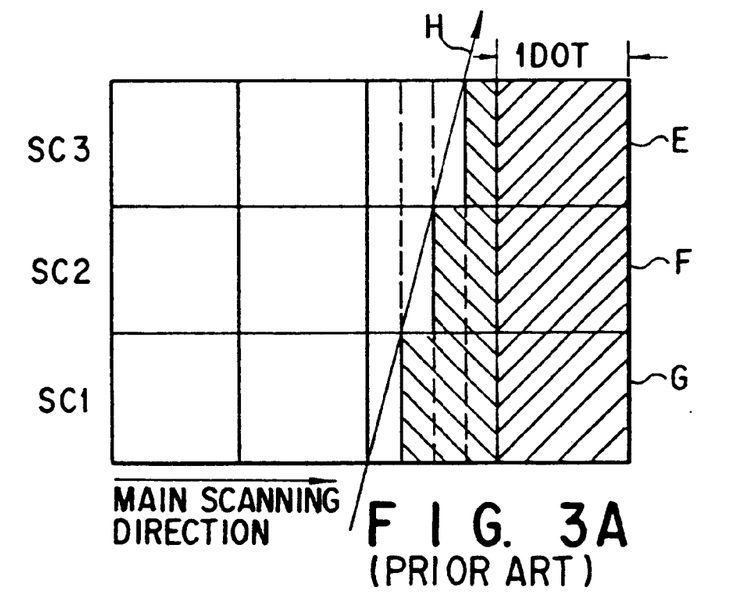
FIGS. 3A and 3B are diagrams for explaining an edge correction function of a conventional laser printer.

Meanwhile, some of the conventional laser printers have an edge correction function. These printers irradiate a laser beam onto part of the spaces which have a width for one dot and located next to edge dots in the main scanning direction so that a smooth outline can be obtained in a printed image. In a case where the period of the dot exposing cycle is set equal to a period corresponding to four print clock pulses and an outline of inclination H shown in FIG. 3A is required for edge dots G, F, and E, the laser diode 1 is additionally driven during the periods corresponding to three print clock pulses, two print clock pulses, and one print clock pulse in scanning the spaces next to the edge dots G, F, and E, respectively. This allows the outline of inclination H to have reduced steps along the dots G, F, and E. Therefore, the outline can be smooth or linear.

Figure 4A:
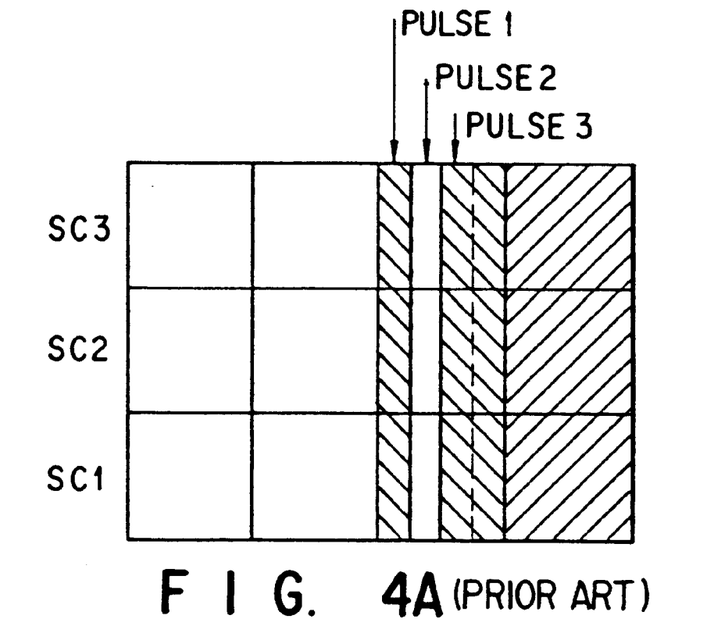
FIGS. 4A and 4B are diagrams for explaining a variable tone setting function of a conventional laser printer.

In addition, some of the conventional laser printers have a variable tone setting function. In these printers, a laser beam is not continuously irradiated for a period of the dot exposing cycle equal to a period corresponding to a preset number of print clock pulses. Instead, these printers inhibits driving of the laser diode 1 during the period corresponding to a part of the preset number of print clock pulses. In a case where the period of the dot exposing cycle is set equal to a period corresponding to four print clock pulses, driving of laser diode 1 is inhibited during the period of at least one pulse which is selected from the first to fourth print clock pulses according to a tone level to be set for one dot. For example, when driving of the laser diode 1 is inhibited during the period of the second print clock pulse shown in FIG. 4A, the tone level of the dot can be lowered in comparison with the case where the laser diode 1 is driven during the entire periods of first to fourth print clock pulses.

However, it is difficult for the correction technique of controlling the dot exposing cycle to be applied to laser printers having an edge correction function or a variable tone setting function described above.

Figure 3B:
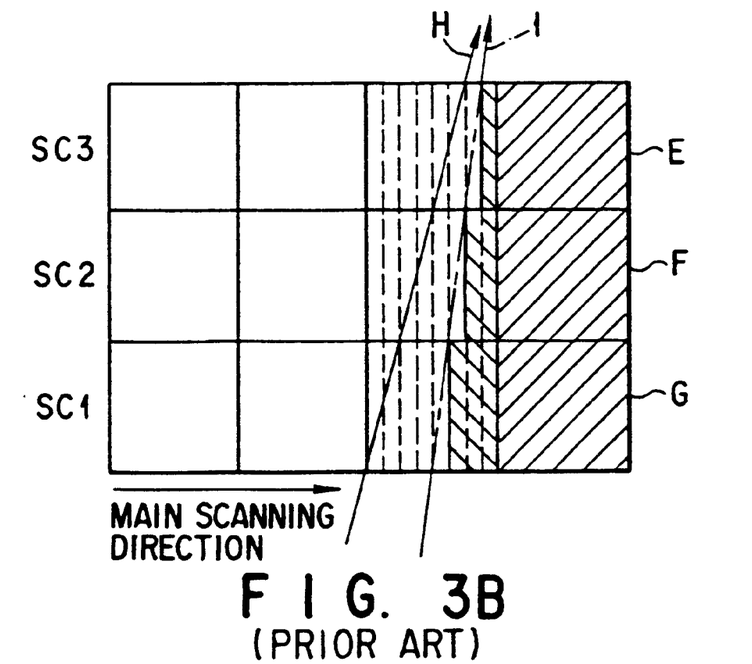

In the laser printer having the edge correction function, normal edge correction is interfered by the control of the dot exposing cycle. For example, the laser diode 1 is additionally driven in a state where the period of the dot exposing cycle is set equal to a period corresponding to four print clock pulses in the scanning of the exposure areas A and D shown in FIG. 1 and equals to a period corresponding to eight print clock pulses in the scanning of the exposure areas B and C shown in FIG. 1. In this case, as shown in FIG. 3B, an outline of inclination H would be obtained in the exposure areas A and D and an outline of inclination I would be obtained in the exposure areas B and C. That is, edge correction cannot be performed uniformly among these exposure areas to obtain outlines of the same inclination.

Figure 4B:
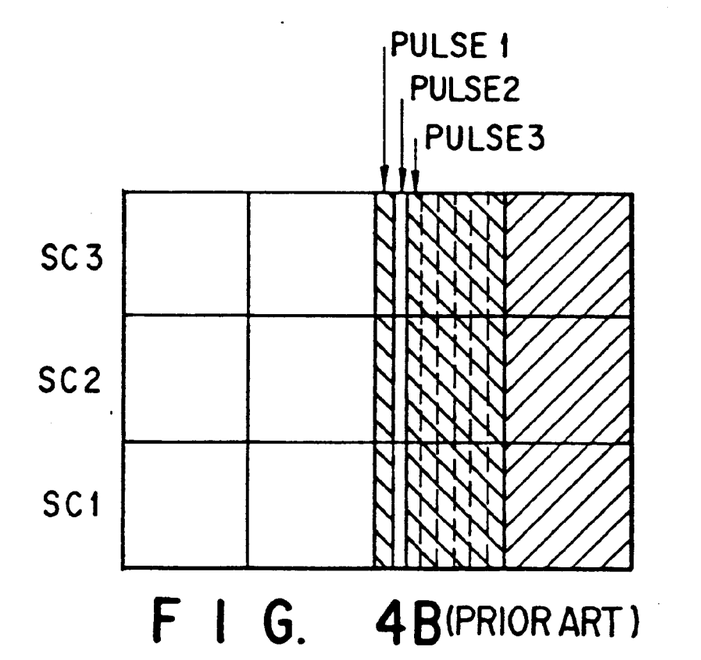

Further, in the laser printer having the variable tone setting function, normal variable tone setting is interfered by the control of the dot exposing cycle. For example, the laser diode 1 is inhibited to be driven during the period of one print clock pulse in a state where the period of the dot exposing cycle is set equal to a period corresponding to four print clock pulses in the scanning of the exposure areas A and D shown in FIG. 1 and equals to a period corresponding to eight print clock pulses in the scanning of the exposure areas B and C shown in FIG. 1. In this case, as shown in FIG. 4B, the width of an unexposed portion would be narrower in the exposure areas B and C than in the exposure areas A and D. That is, variable tone setting cannot be performed uniformly among these exposure areas to obtain the same tone level.

SUMMARY OF THE INVENTION

An object of the present invention is to provide an exposing device which can vary the dot exposing cycle without impairing an edge correction function or variable tone setting function.

The object of the present invention can be achieved by an exposing device which comprises a photosensitive member having a surface partitioned into a plurality of exposure areas in a scanning direction, for carrying an image formed by exposing the surface; a laser light source for emitting a laser beam; a polygon mirror for rotating at a constant speed to scan the surface of the photosensitive member in the scanning direction with the laser beam from the laser light source; a light source controller for producing items of emission data for one line while the number of emission data items for one dot is varied for each exposure area, and for supplying the emission data items for one line to the laser light source in response to a clock pulse; wherein the light source controller includes an emission data producing section for multiplying a reference value for the number of data items which should be selected from emission data items for a dot and changed in value to obtain a predetermined function, by a coefficient for an exposure area to which the emission data items for the dot are assigned, and for changing the value of each data item selected from the emission data items for the dot in number corresponding to a result of multiplication.

In the exposing device, the emission data producing section multiplies a reference value for the number of data items which should be selected from emission data items for a dot and changed in value to obtain an edge correction or variable tone setting function, by a coefficient for an exposure area to which the emission data items for the dot are assigned, and changes the value of each data item selected from the emission data items for the dot in number corresponding to a result of multiplication. Therefore, even if the dot exposing cycle is varied for each exposure area, the edge correction or variable tone setting function is not impaired.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

A laser printer according to a first embodiment of the present invention will be described with reference to the drawings.

Figure 5:
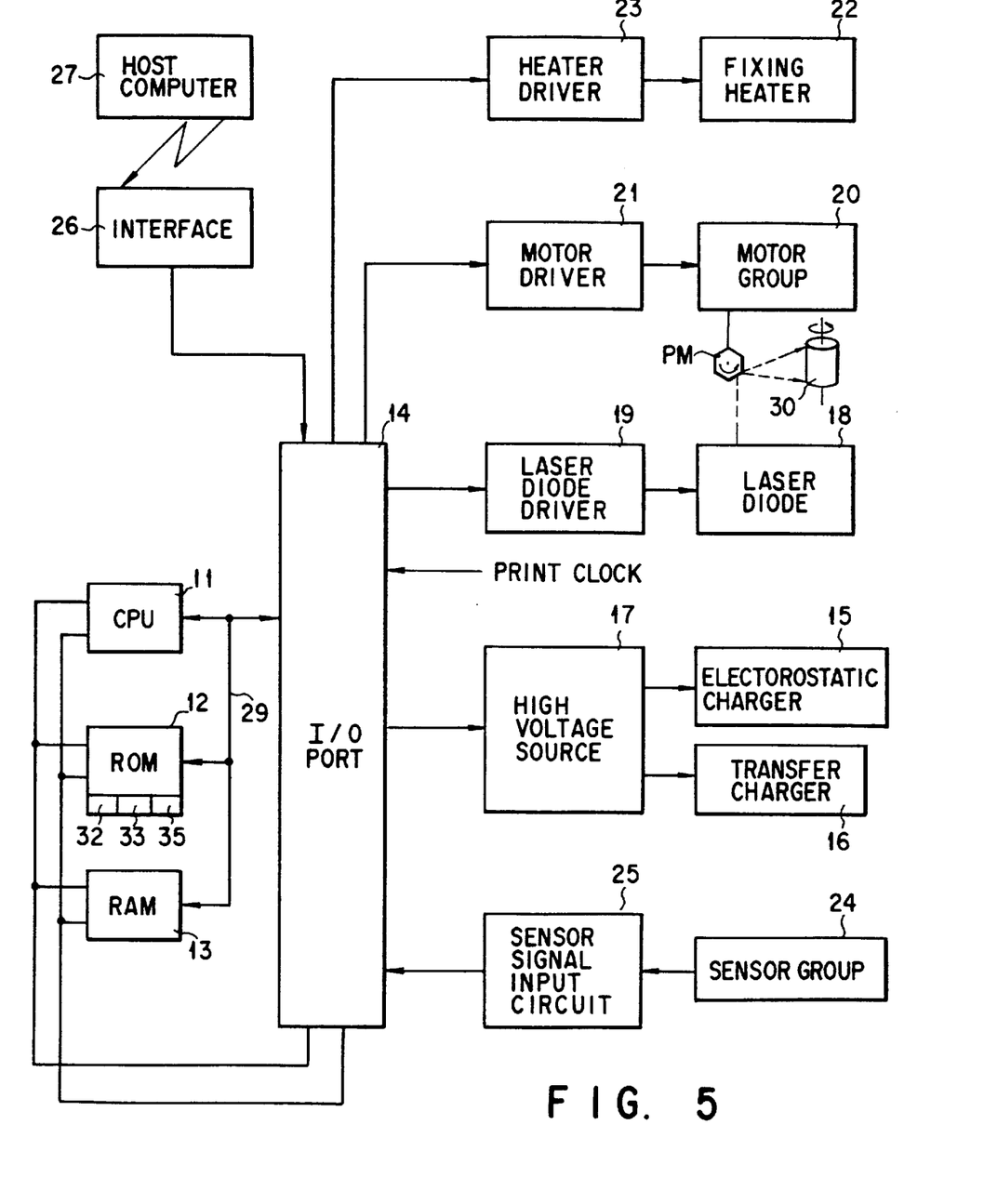
FIG. 5 is a block diagram schematically showing a circuit configuration of a laser printer according to a first embodiment of the present invention.

FIG. 5 shows the structure of the laser printer. This laser printer includes a Central Processing Unit (CPU) 11 serving as a main control section, a Read Only Memory (ROM) 12 storing fixed data such as a control program for and the like, a Random Access Memory (RAM) 13 for storing data input to and output from the CPU 11, and an Input/Output (I/O) port 14.

The RAM 13 has memory areas serving as a image data memory for storing image data in a dot-matrix form, an emission data memory for storing emission data items for one line, and the like. The CPU 11, ROM 12, RAM 13, and I/O port 14 are connected with each other through bus lines 29 formed of an address bus, a data bus, a control bus, and the like.

The I/O port 14 is connected to a high voltage source 17, a laser diode driver 19, a motor driver 21, a heater driver 23, a sensor signal input circuit 25, and a communication interface 26. The high voltage source 17 is connected to an electrostatic charger 15 and a transfer charger 16. The laser diode driver 19 is connected to a laser diode 18. The motor driver 21 is connected to a motor group 20. The heater driver 23 is connected to a fixing heater 22. The sensor signal input circuit 25 is connected to a sensor group 24. The interface 26 is connected to a host computer 27 via a communication cable. The motor group 20 is connected to a polygon mirror PM, a photosensitive drum 30, paper feed rollers (not shown), and other components.

The CPU 11 controls the aforementioned components by executing the control program stored in the ROM 12. In this control, the electrostatic charger 15 uniformly applies electrostatic charge onto the surface of the photosensitive drum 30 by means of a high voltage from the high voltage source 17. The laser diode driver 19 selectively drives the laser diode 19 based on each of emission data items which are sequentially supplied in response to a print clock pulse, causing the laser diode 19 to emit a laser beam. The polygon mirror PM rotates at a constant speed as shown in FIG. 5 and reflects a laser beam from the laser diode 19 to scan the surface of the photosensitive drum 30 in a main scanning direction which is set along a shaft of the drum 30 and thereby selectively expose the surface of the photosensitive drum 30. This exposure allows an image for one line to be formed on the surface of the photosensitive drum 30 as an electrostatic latent image. The photosensitive drum 30 is rotated by a preset amount each time the scanning is effected for one line. Thus, an image obtained for plural lines is developed as a toner image in which toner is adhered to dot portions. The transfer charger 16 applies electrostatic charge onto a sheet of paper by means of a high voltage from the high voltage source 17 so as to transfer the toner image on the photosensitive drum 30 to the paper sheet. This sheet is supplied from a paper cassette to the transfer charger 16 by paper feed rollers driven at a predetermined timing. The heater driver 23 controls power to be supplied to the fixing heater 22 so as to fix the transferred image on the paper sheet. The sensor group 24 includes a paper sensor for sensing a presence and absence of paper, a laser beam sensor for sensing a laser beam reflected by the polygon mirror PM and directed toward a scanning start position located near an end of the photosensitive drum 30, and other sensors. The interface 26 receives print data containing exposure area information transmitted from the host computer 27, and transmits various processing data to the host computer 27.

Figure 7:
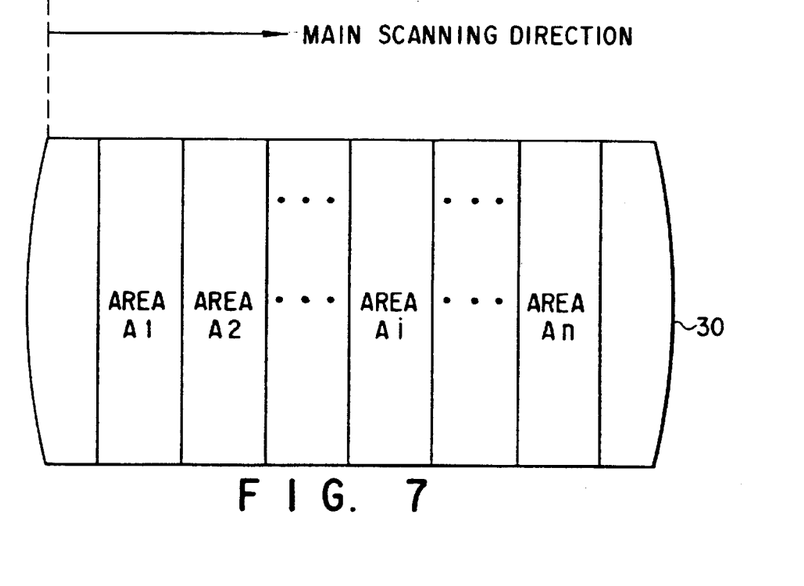
FIG. 7 is a view showing exposure areas on a photosensitive drum shown in FIG. 5.

As shown in FIG. 7, the surface of the photosensitive drum 30 is partitioned into a plurality of exposure areas A1 to An in the main scanning direction. The ROM 12 has memory areas serving as a pulse number data table 32, a smoothing data table 35, a coefficient data table 33. The pulse number data table 32 stores items of pulse number data respectively prepared for the exposure areas A1 to An. Each item of pulse number data represents the number N of print clock pulses identical to the number of emission data items for one dot. The smoothing data table 35 stores items of smoothing data respectively prepared for various inclinations for an outline. Each item of smoothing data represents a reference value for the number of print clock pulses (or the number of emission data items of "1" (=ON)) corresponding to a period during which the laser beam should be irradiated on part of the space which has a width for one dot and located next to an edge dot forming an outline. The coefficient data table 33 stores items of coefficient data respectively prepared for the exposure areas A1 to An. Each item of coefficient data represents a coefficient D to be multiplied by the value of a smoothing data item.

The print clock pulse number N (dot exposing cycle) is set such that the number N is greater for exposure areas in the control portion of the photosensitive drum 30 than for exposure areas in the end portions of the drum, wherein the former exposure areas are scanned at a higher scanning speed than the latter exposure areas. This is because fθ error correction is performed for uniformly making the size of a dot formed in each exposure area on the photosensitive drum 30, regardless of the mirror angle of a polygon mirror PM. The fθ error correction is achieved more accurately as the number (n) of exposure areas is increased.

In addition the coefficient D is set such that this coefficient increases in proportion to the print clock pulse number N so as to adjust the value of the smoothing data for each exposure area. This is because the width of the portion onto which a laser beam is additionally irradiated during edge correction is uniform in each exposure area.

Figure 6:
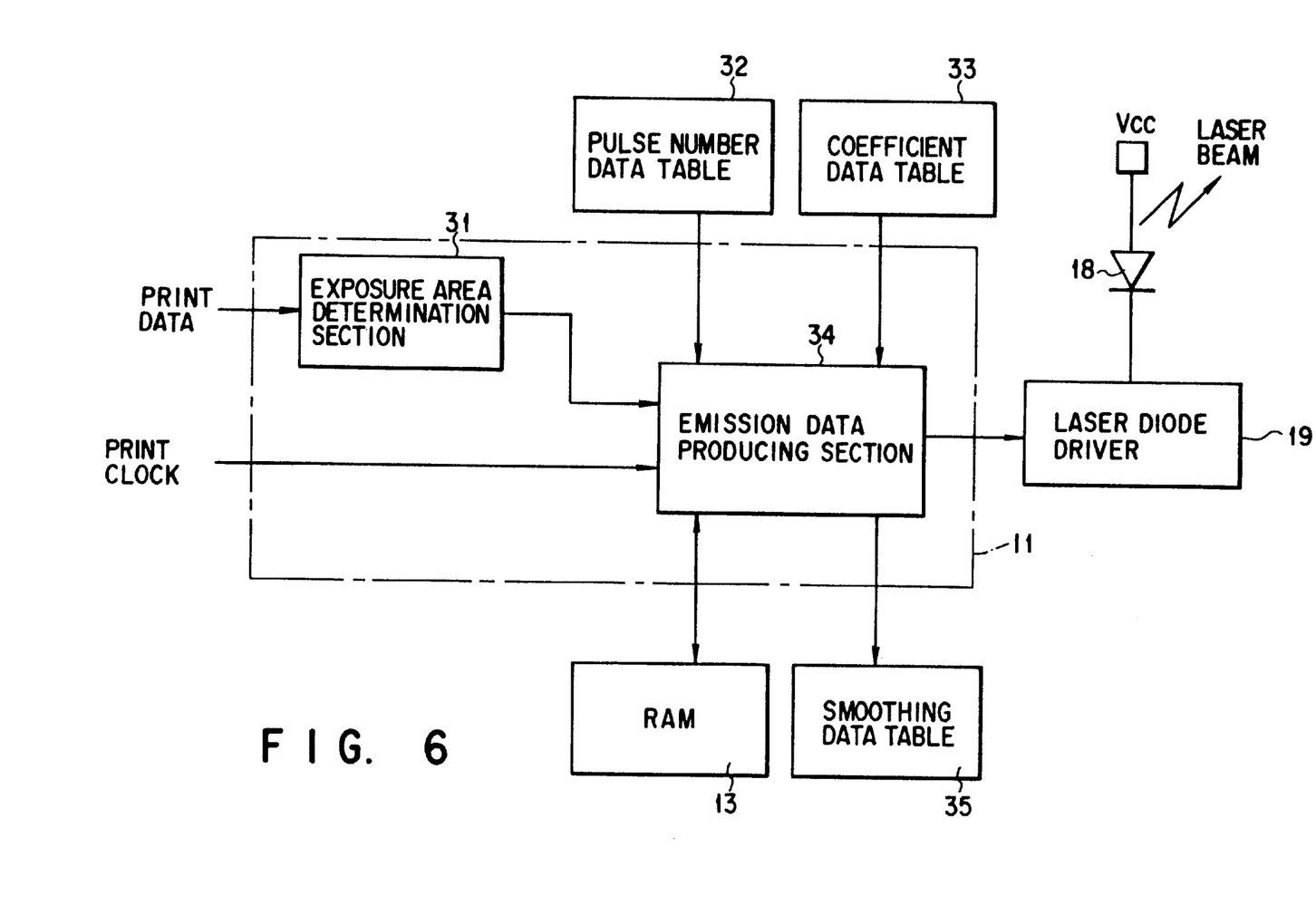
FIG. 6 is a block diagram showing the structure of an exposure control circuit of the laser printer shown in FIG. 5.
Figure 8:
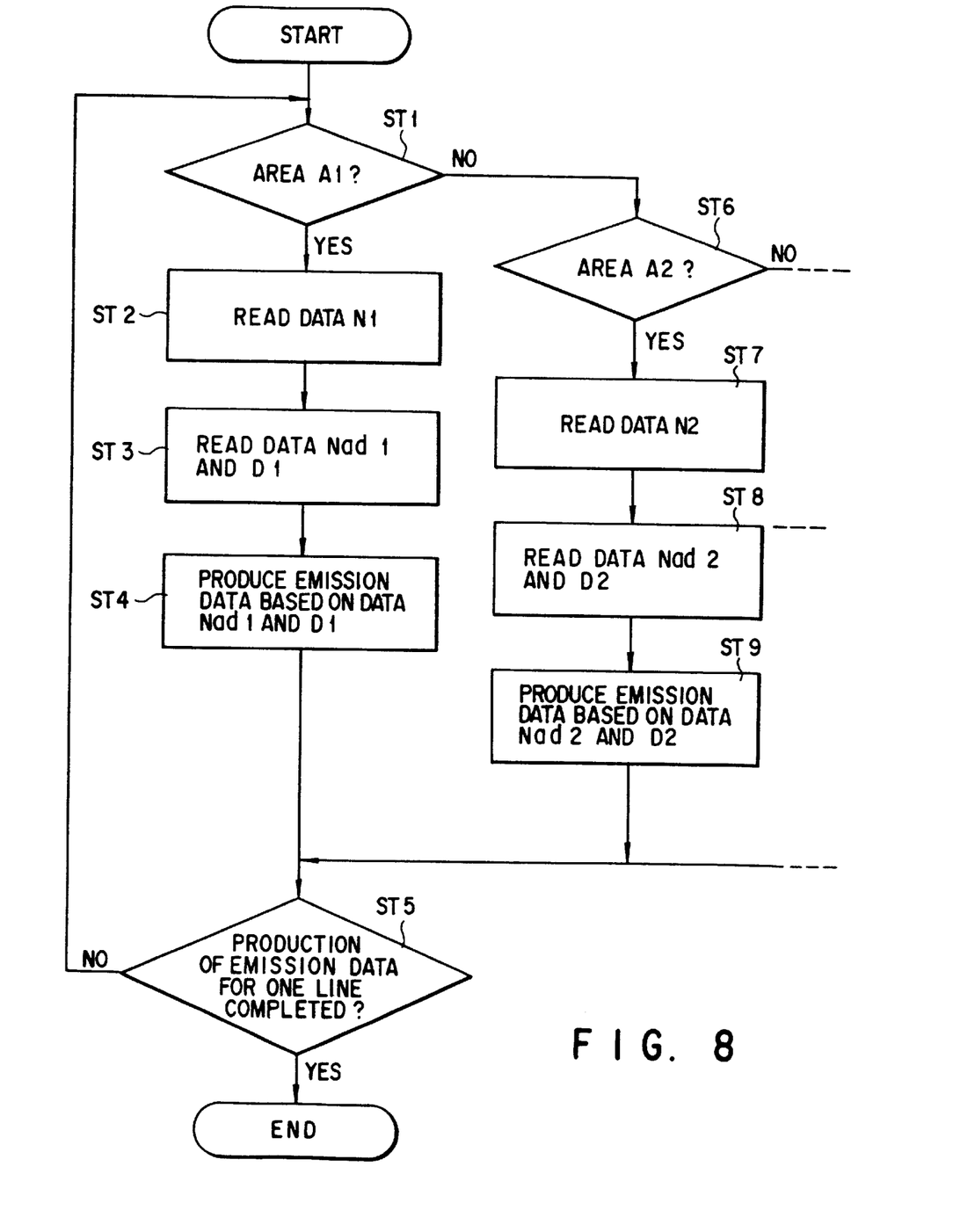
FIG. 8 is a flow chart showing an emission data producing process of the exposure control circuit shown in FIG. 6.

FIG. 6 shows an exposure control circuit of the laser printer. The CPU 11 shown in FIG. 5 performs exposure control in accordance with a control program stored in the ROM 12. In this exposure control, the CPU 11 serves as an exposure area determination section 31 and also as an emission data producing section 34. The CPU 11 determines the exposure area among the exposure areas A1–An to which the print data received from the host computer 27 belongs. The CPU 11 also converts the print data into image data of a dot-matrix form, and stores it into the RAM 13. In the RAM 13, the image data is stored in to a portion of the image data memory corresponding to the exposure area thus determined. Thereafter, the CPU 11 performs an emission data producing process for producing emission data items for one line, as shown in FIG. 8.

In this emission data producing process, the CPU 11 reads image data for one dot from the RAM 13, and checks whether or not the image data belongs to exposure area A1, in step ST1. If it is determined that the image data belongs to the exposure area A1, pulse number data N1 corresponding to the exposure area A1 is read out from the pulse number data table 32, and is set as an emission data number for one dot, in step ST2. Further, if image data for one dot represents a space next to an edge dot to be subjected to edge correction, the CPU 11 reads coefficient data D1 corresponding to the exposure area A1 and smoothing data Nad1 corresponding to an inclination designated for an outline assigned to the edge dot, respectively, from the coefficient data table 33 and the smoothing data table 35, in step ST3. Note that no operation is carried out in step ST3 if the image data represents a space or dot which does not relates to edge correction.

In step ST4, the CPU 11 produces items of emission data whose values depend on image data and whose number is equivalent to the number set in step ST2, and stores them into the emission data memory. These emission data items are all set to "1" if the image data represents a dot, while they are all set to "0" if the image data represents a space. If the image data represents a space and if the smoothing data Nad1 and the coefficient data D1 have been read out, the smoothing data Nad1 is multiplied by the coefficient data D1, and emission data items equivalent in number to the multiplication result (i.e., smoothing data Nad1×coefficient data D1) are changed to "1" (=ON) on the side of emission data items for the edge dot to be subjected to edge correction.

Thereafter, in step ST5, whether or not production of emission data for one line has been completed is checked. If production of emission data items for one line has not yet been completed, step ST1 is performed again.

If it is determined that image data does not belong to the exposure area A1, the image data is checked as to whether or not it belongs to the exposure area A2 in step ST6. In step ST7, pulse number data N2 corresponding to this exposure area A2 is read out from a pulse number data table 32, and is set as an emission data number for one dot. Further, if image data for one dot represents a space next to an edge dot to be subjected to edge correction, the CPU 11 reads coefficient data D2 corresponding to this exposure area A2 and smoothing data Nad2 corresponding to an inclination designated for an outline assigned to the edge dot, respectively, from the coefficient data table 33 and the smoothing data table 35, in step ST8. Note that no operation is carried out in step ST8 if the image data represents a space or dot which does not relates to edge correction.

In step ST9, the CPU 11 produces items of emission data whose values depend on image data and whose number is equivalent to the number set in step ST2, and stores them into the emission data memory. These emission data items are all set to "1" if the image data represents a dot, while they are all set to "0" if the image data represents a space. If the image data represents a space and if the smoothing data Nad2 and the coefficient data D2 have been read out, the smoothing data Nad2 is multiplied by the coefficient data D2, and emission data items equivalent in number to the multiplication result (i.e., smoothing data Nad2×coefficient data D2) are changed to "1" (=ON) on the side of emission data items for the edge dot to be subjected to edge correction.

Thereafter, in step ST5, whether or not production of emission data for one line has been completed is checked. If production of emission data items for one line has not yet been completed, step ST is performed again.

If the image data belongs to neither of exposure area A1 nor A2, the image data is checked as to remaining exposure areas A3 to An, and the processing is performed as explained above. Emission data producing process ends when emission data items for one line are thus obtained in this manner.

Emission data items for one line are sequentially read out from the an emission data memory in response to a print clock pulse, and are supplied to a laser diode driver 19. The laser diode driver 19 supplies a drive current for a laser diode 18 when an emission data item "1" is supplied, and stops supplying the drive current when an emission data item "0" is supplied.

Emission data production process is repeated to perform scanning for all lines. In a case where an image of one page is printed by one turn of the photosensitive drum 30, an emission data memory may be prepared so as to store emission data items produced in units of lines for one page, and exposure may be started after emission data items for one page are produced.

Edge correction will be explained below, supposing that the photosensitive drum 30 is partitioned into four exposure areas A1 to A4 in the main scanning direction. When the print clock pulse number N defining the dot exposing cycle is set to 4 for end portion exposure areas A1 and A4 and is set to 8 for center exposure areas A2 and A3, the coefficient data D is set to 1 for end portion exposure areas A1 and A4 and is set to 2 for center exposure areas A2 and A3.

Figure 9A:
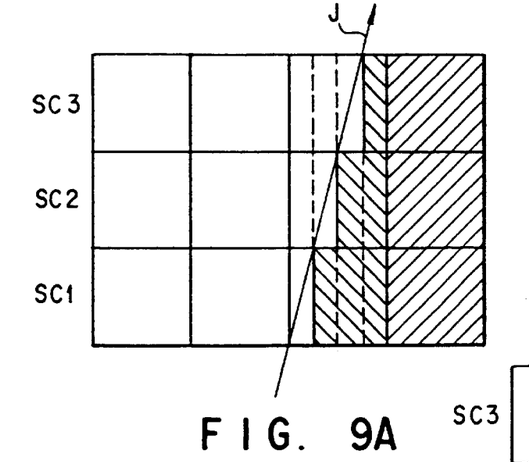
FIGS. 9A and 9B show diagrams showing an edge correction function of the exposure control circuit shown in FIG. 6.
Figure 9B:
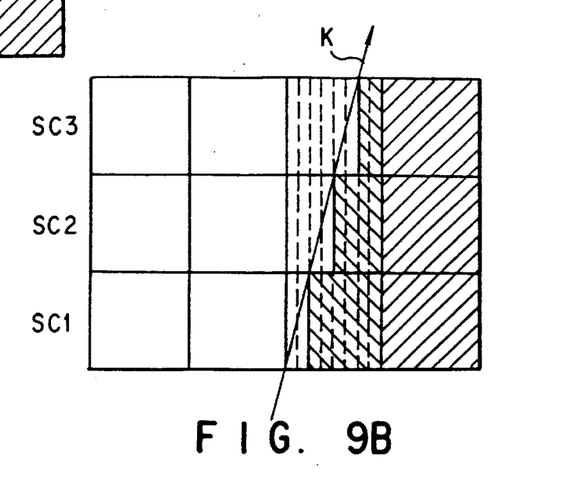

As a result of this, with respect to the end exposure areas A1 and A4, edge correction is performed by multiplying smoothing data Nad by coefficient data D (=1), and further by changing the values of emission data items equivalent in number to the number obtained as the multiplication result. On the other hand, with respect to the center exposure areas A2 and A3, edge correction is performed by multiplying soothing data Nad by coefficient data D (=2), and further by changing the values of emission data items equivalent in number to the number obtained as the multiplication result. When edge correction is performed on the basis of the same smoothing data Nad, an inclination of an outline as indicated by an arrow J in FIG. 9A is obtained with respect to the end exposure areas A1 and A4, while an inclination of an outline as indicated by an arrow K in FIG. 9B is obtained with respect to the center exposure areas A2 and A3. This means that both of the outlines have a uniform inclination in each exposure area.

In this embodiment, even when correction of an fθ error is performed with the number of print clock pulses defining the dot exposing cycle is being changed for every exposure area, inclinations of outlines do not differ between respective exposure areas since edge correction is performed on the basis of coefficient data set for respective exposure areas. As a result of this, edge correction can be performed at a uniform degree in any of exposure areas.

Further, since correction of an fθ error is carried out without using an fθ lens, the size and the price of a laser printer can be reduced.

A laser printer according to a second embodiment of the present invention will be described with reference to the accompanying drawings.

Figure 10:
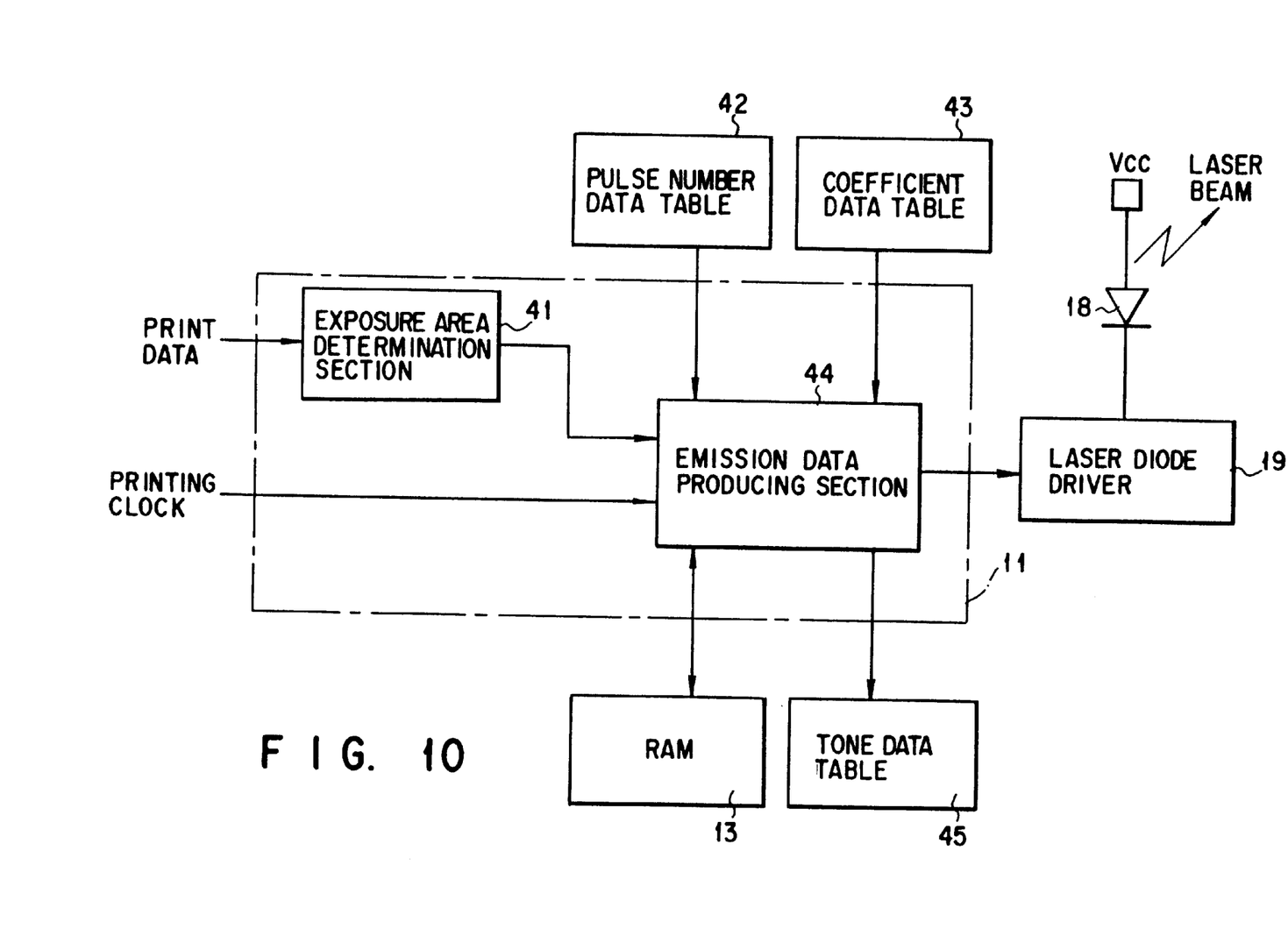
FIG. 10 is a block diagram showing the structure of an exposure control circuit of a laser printer according to a second embodiment of the present invention.

This laser printer is has a structure substantially identical to that shown in FIG. 5. Therefore, the similar components are represented by the same reference numerals, and their detailed explanations are omitted. FIG. 10 shows the structure of an exposure control circuit of the laser printer. Since this exposure control circuit has a variable tone setting function instead of an edge correction function, it differs from that shown in FIG. 6.

Figure 11:
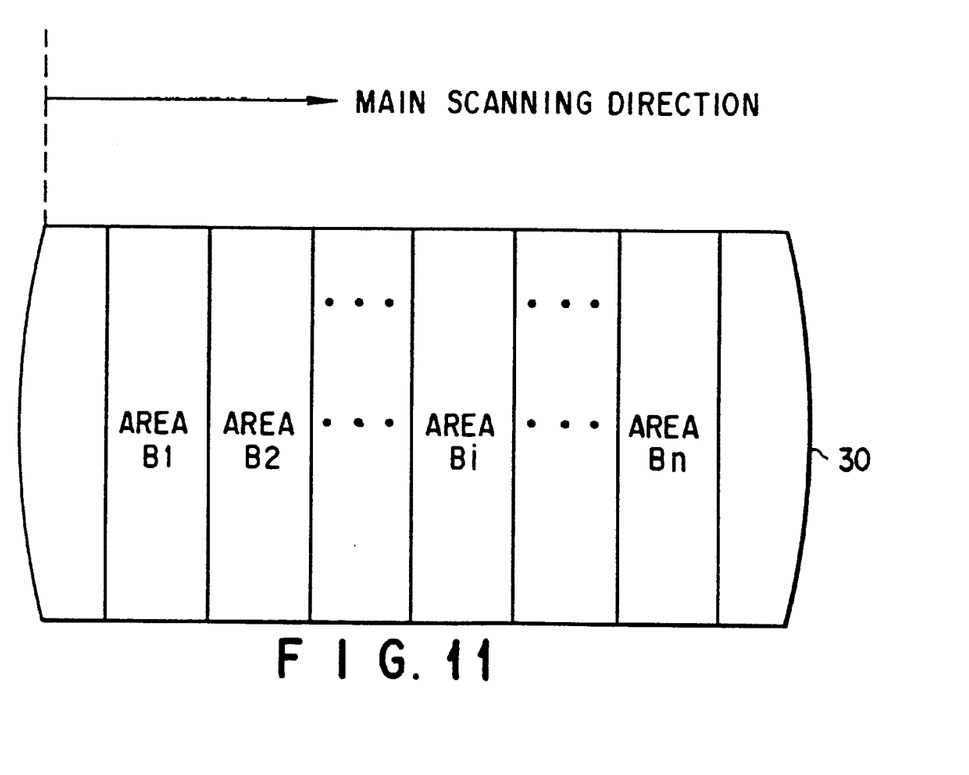
FIG. 11 is a view showing exposure areas on a photosensitive drum which is exposed to a laser beam from a laser diode shown in FIG. 10.

As shown in FIG. 11, the surface of the photosensitive drum 30 is partitioned into a plurality of exposure areas B1 to Bn in the main scanning direction. The ROM 12 has memory areas serving as a pulse number data table 42, a tone data table 45, a coefficient data table 43. The pulse number data table 42 stores items of pulse number data respectively prepared for the exposure areas B1 to Bn. Each item of pulse number data represents the number M of print clock pulses identical to the number of emission data items for one dot. The tone data table 45 stores items of tone data respectively prepared for various tone levels. Each item of tone data represents a reference value for the number of print clock pulses (or the number of emission data items of "0" (=OFF)) corresponding to a period during which driving of the laser diode 19 is inhibited to set a tone level for a dot. The coefficient data table 43 stores items of coefficient data respectively prepared for the exposure areas B1 to Bn. Each item of coefficient data represents a coefficient E to be multiplied by the value of a tone data item.

The print clock pulse number M (dot exposing cycle) is set such that the number M is greater for exposure areas in the control portion of the photosensitive drum 30 than for exposure areas in the end portions of the drum, wherein the former exposure areas are scanned at a higher scanning speed than the latter exposure areas. This is because fθ error correction is performed for uniformly making the size of a dot formed in each exposure area on the photosensitive drum 30, regardless of the mirror angle of a polygon mirror PM. The fθ error correction is achieved more accurately as the number (n) of exposure areas is increased.

In addition the coefficient E is set such that this coefficient increases in proportion to the print clock pulse number M so as to adjust the value of the tone data for each exposure area. This is because the width of the portion onto which a laser beam is not irradiated during tone setting is uniform in each exposure area.

Figure 12:
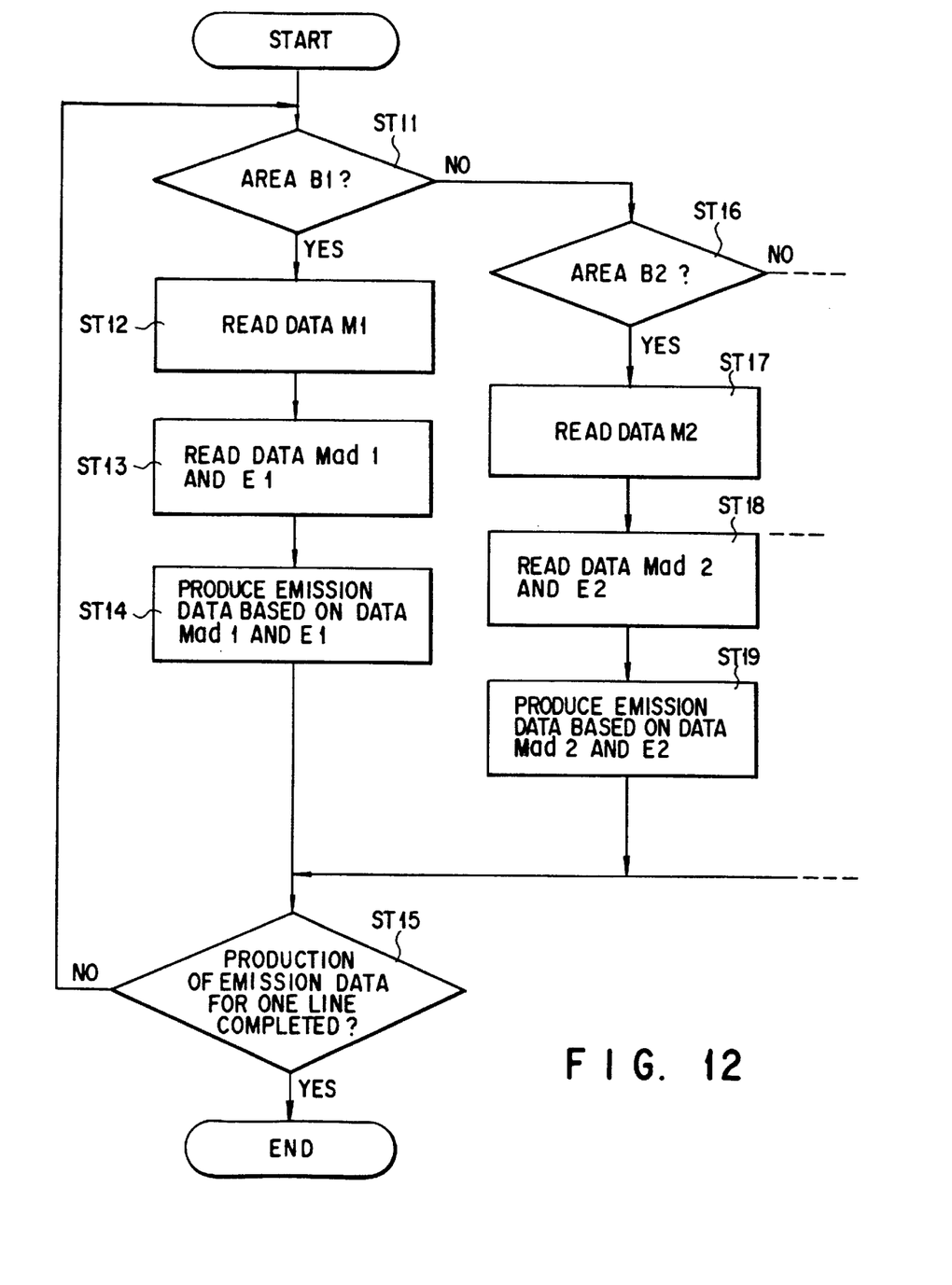
FIG. 12 is a flow chart showing an emission data producing process of the exposure control circuit shown in FIG. 10.

The CPU 11 shown in FIG. 10 performs exposure control in accordance with a control program stored in the ROM 12. In this exposure control, the CPU 11 serves as an exposure area determination section 31 and also as an emission data producing section 44. The CPU 11 determines the exposure area among the exposure areas B1–Bn to which the print data received from the host computer 27 belongs. The CPU 11 also converts the print data into image data of a dot-matrix form, and stores it into the RAM 13. In the RAM 13, the image data is stored into a portion of the image data memory corresponding to the exposure area thus determined. Thereafter, the CPU 11 performs an emission data producing process for producing emission data items for one line, as shown in FIG. 12.

In this emission data producing process, the CPU 11 reads image data for one dot from the RAM 13, and checks whether or not the image data belongs to exposure area B1, in step ST11. If it is determined that the image data belongs to the exposure area B1, pulse number data M1 corresponding to the exposure area B1 is read out from the pulse number data table 42, and is set as an emission data number for one dot, in step ST12. Further, if image data for one dot represents a dot, the CPU 11 reads coefficient data E1 corresponding to the exposure area B1 and tone data Mad1 corresponding to a tone level designated for the dot, respectively, from the coefficient data table 43 and the tone data table 45, in step ST13. Note that no operation is carried out in step ST13 if the image data represents a space.

In step ST14, the CPU 11 produces items of emission data whose values depend on image data and whose number is equivalent to the number set in step ST12, and stores them into the emission data memory. These emission data items are all set to "1" if the image data represents a dot, while they are all set to "0" if the image data represents a space. If the image data represents a dot and if the tone data Mad1 and the coefficient data E1 have been read out, the tone data Mad1 is multiplied by the coefficient data E1, and emission data items equivalent in number to the multiplication result (i.e., tone data Mad1×coefficient data E1) are changed to "0" (=OFF).

Thereafter, in step ST15, whether or not production of emission data for one line has been completed is checked. If production of emission data items for one line has not yet been completed, step ST11 is performed again.

If it is determined that image data does not belong to the exposure area B1, the image data is checked as to whether or not it belongs to the exposure area B2 in step ST16. In step ST17, pulse number data M2 corresponding to this exposure area B2 is read out from a pulse number data table 42, and is set as an emission data number for one dot. Further, if image data for one dot represents a dot, the CPU 11 reads coefficient data E2 corresponding to this exposure area B2 and tone data Mad2 corresponding to a tone level designated for the dot, respectively, from the coefficient data table 43 and the tone data table 45, in step ST18. Note that no operation is carried out in step ST18 if the image data represents a space.

In step ST19, the CPU 11 produces items of emission data whose values depend on image data and whose number is equivalent to the number set in step ST17, and stores them into the emission data memory. These emission data items are all set to "1" if the image data represents a dot, while they are all set to "0" if the image data represents a space. If the image data represents a space and if the tone data Mad2 and the coefficient data E2 have been read out, the tone data Mad2 is multiplied by the coefficient data E2, and emission data items equivalent in number to the multiplication result (i.e., tone data Mad2×coefficient data E2) are changed to "0" (=OFF).

Thereafter, in step ST15, whether or not production of emission data for one line has been completed is checked. If production of emission data items for one line has not yet been completed, step ST11 is performed again.

If the image data belongs to neither of exposure area B1 nor B2, the image data is checked as to remaining exposure areas B3 to Bn, and the processing is performed as explained above. Emission data producing process ends when emission data items for one line are thus obtained in this manner.

Emission data items for one line are sequentially read out from the an emission data memory in response to a print clock pulse, and are supplied to a laser diode driver 19. The laser diode driver 19 supplies a drive current for a laser diode 18 when an emission data item "1" is supplied, and stops supplying the drive current when an emission data item "0" is supplied.

Emission data production process is repeated to perform scanning for all lines. In a case where an image of one page is printed by one turn of the photosensitive drum 30, an emission data memory may be prepared so as to store emission data items produced in units of lines for one page, and exposure may be started after emission data items for one page are produced.

Tone setting will be explained below, supposing that the photosensitive drum 30 is partitioned into four exposure areas B1 to B4 in the main scanning direction. When the print clock pulse number M defining the dot exposing cycle is set to 4 for end portion exposure areas B1 and B4 and is set to 8 for center exposure areas B2 and B3, the coefficient data E is set to 1 for end portion exposure areas Bi and B4 and is set to 2 for center exposure areas B2 and B3.

Figure 13A:
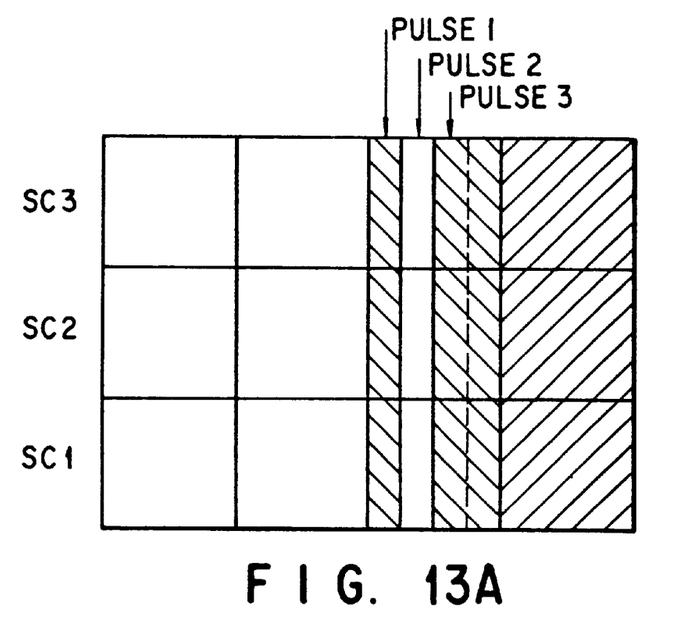
FIGS. 13A and 13B show diagrams for explaining a variable tone setting function of the exposure control circuit shown in FIG. 10.
Figure 13B:
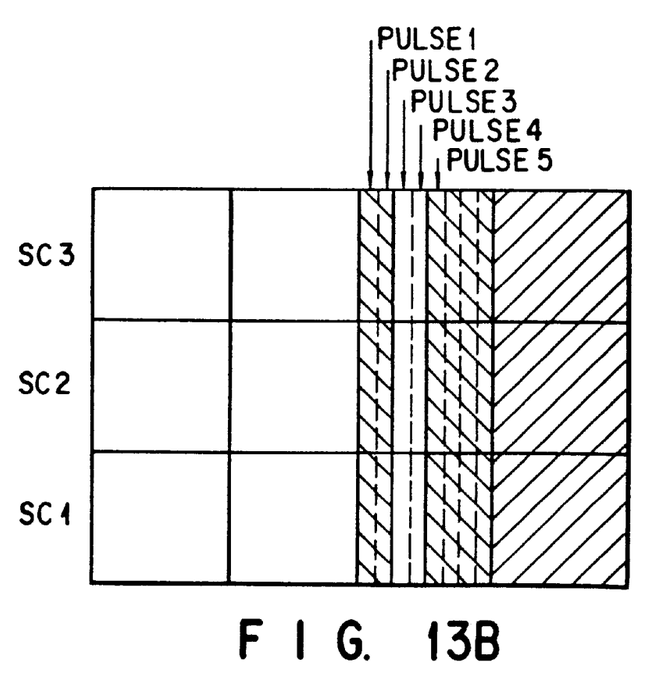

As a result of this, with respect to the end exposure areas B1 and B4, tone setting is performed by multiplying tone data Mad by coefficient data E (=1), and further by changing the values of emission data items equivalent in number to the number obtained as the multiplication result. On the other hand, with respect to the center exposure areas B2 and B3, tone setting is performed by multiplying soothing data Mad by coefficient data E (=2), and further by changing the values of emission data items equivalent in number to the number obtained as the multiplication result. When tone setting is performed on the basis of the same tone data Mad, driving of the laser diode 18 is inhibited during the period of the second print clock pulse shown in FIG. 13A with respect to the end exposure areas B1 and B4, while driving of the laser diode 18 is inhibited during the periods of the third and fourth print clock pulses shown in FIG. 13B with respect to the center exposure areas B2 and B3. This means that the width of an unexposed portion can be uniformly set in each exposure area.

In this embodiment, even when correction of an fθ error is performed with the number of print clock pulses defining the dot exposing cycle is being changed for every exposure area, the width of an unexposed portion do not differ between respective exposure areas since tone setting is performed on the basis of coefficient data set for respective exposure areas. As a result of this, tone setting can be performed at a uniform degree in any of exposure areas.

Further, since correction of an fθ error is carried out without using an fθ lens, the size and the price of a laser printer can be reduced.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An exposing device comprising:
 a photosensitive member having a surface which is partitioned into a plurality of exposure areas in a scanning direction, for carrying an image formed by selectively exposing the surface of said photosensitive member;
 a laser light source associated with said photosensitive member for emitting a laser beam;
 a rotatable polygon mirror associated with said photosensitive member for rotating at a substantially constant speed to scan the surface of said photosensitive member in the scanning direction with the laser beam emitted from said laser light source, said rotatable polygon mirror being spaced from said photosensitive member without an fθ lens being provided therebetween; and a light source controller associated with and driving said laser light source when producing a variable number of emission data items from each of image data items for dots forming one line and supplying the emission data items to said laser light source in response to clock pulses which are sequentially supplied thereto in a preset cycle, said variable number being varied for each exposure area to match an exposing period for one dot with a variation in a scanning speed of said rotatable polygon mirror, thereby correcting an fθ error without using an fθ lens between said rotatable polygon mirror and said photosensitive member;

wherein said light source controller includes emission data control means for selecting at least one of the emission data items produced from the image data item for a specified dot, and modifying a value of the selected emission data item to attain a predetermined function; and wherein said emission data control means includes means for determining a number of emission data items to be selected for modification by multiplying a reference value which includes a preset number, with a coefficient for an exposure area to which said specified dot is assigned.

2. An exposing device according to claim 1, wherein said light source controller further includes:

a smoothing data table for generating smoothing data corresponding to an inclination designated for an outline, said smoothing data representing a reference value for a number of clock pulses corresponding to a period during which the laser beam should be irradiated to part of a space which has a width for one dot and which is located next to an edge dot forming an outline, and which reference value corresponds to an inclination designated for the outline; and a coefficient data table for generating coefficient data corresponding to an exposure area to which said space belongs, and wherein said emission data control means multiplies a coefficient represented by said coefficient data by the reference value represented by the smoothing data from said smoothing data table.

3. An exposing device according to claim 1, wherein said light source controller further includes:

a tone data table for generating tone data corresponding to a tone level designated for a dot, said tone data representing a reference value for a number of clock pulses corresponding to a period during which driving of the laser light source should be inhibited to set the tone level; and a coefficient data table for generating coefficient data corresponding to an exposure area to which said dot belongs, and wherein said emission data control means multiplies a coefficient represented by said coefficient data by a tone level represented by the tone data from said tone data table.

* * * * *